US008829421B2

(12) United States Patent
Noguchi et al.

(10) Patent No.: US 8,829,421 B2
(45) Date of Patent: Sep. 9, 2014

(54) OPTICAL ENCODER

(75) Inventors: Takuya Noguchi, Tokyo (JP); Hajime Nakajima, Tokyo (JP); Takeshi Musha, Tokyo (JP); Yoshinao Tatei, Tokyo (JP); Takashi Hirai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/000,736

(22) PCT Filed: Nov. 30, 2011

(86) PCT No.: PCT/JP2011/077630
§ 371 (c)(1),
(2), (4) Date: Aug. 21, 2013

(87) PCT Pub. No.: WO2012/114595
PCT Pub. Date: Aug. 30, 2012

(65) Prior Publication Data
US 2013/0320201 A1   Dec. 5, 2013

(30) Foreign Application Priority Data
Feb. 21, 2011   (JP) .................. 2011-034094

(51) Int. Cl.
*G01D 5/34*   (2006.01)
*G01D 5/347*   (2006.01)

(52) U.S. Cl.
CPC .......... *G01D 5/3473* (2013.01); *G01D 5/34784* (2013.01)
USPC ................. 250/231.13; 250/231.18; 356/616; 341/13

(58) Field of Classification Search
USPC ............. 250/231.13, 231.14, 231.16, 231.18, 250/237 G; 356/616, 617; 341/11, 13; 33/1 PT, 1 N
See application file for complete search history.

(56) References Cited

U.S. PATENT DOCUMENTS

2007/0102630 A1 *   5/2007   Igaki et al. ............... 250/231.16

FOREIGN PATENT DOCUMENTS

JP   61 182522   8/1986
JP   8 61990   3/1996

(Continued)

OTHER PUBLICATIONS

International Search Report Issued Feb. 28, 2012 in PCT/JP11/077630 Filed Nov. 30, 2011.

(Continued)

*Primary Examiner* — Kevin Pyo
(74) *Attorney, Agent, or Firm* — Oblon, Spivak, McClelland, Maier & Neustadt, L.L.P.

(57) ABSTRACT

An optical encoder includes: an optical scale having periodical optical patterns and can be relatively and angularly displaced; a projector for irradiating the optical scale with light; a light receiver for receiving light from the optical scale; and a calculator for calculating an absolute rotation angle θ of the optical scale in accordance with a signal from the light receiver. The optical patterns include a plurality of light shielding portions and a plurality of light transmitting portions, each of the portions being located alternately. When a pitch of an n-th light shielding portion in a predetermined circumferential direction is denoted by Pn and a width of the n-th light shielding portion is denoted by Wn, a transmissivity T(θn) corresponding to an angle θn of the n-th light shielding portion and the pitch Pn of the light shielding portion satisfy predetermined equations, and the width Wn of the light shielding portion in the optical pattern varies in accordance with a function of the pitch Pn of the light shielding portion.

2 Claims, 3 Drawing Sheets

(56) References Cited

FOREIGN PATENT DOCUMENTS

| JP | 9 250933 | 9/1997 |
| JP | 2003 75200 | 3/2003 |
| JP | 2003 177036 | 6/2003 |
| JP | 2005 164533 | 6/2005 |
| JP | 2007 248359 | 9/2007 |

OTHER PUBLICATIONS

English translation of the International Preliminary Report on Patentability issued Aug. 29, 2013 in PCT/JP2011/077630 filed Nov. 30, 2011.

* cited by examiner

OPTICAL ENCODER

TECHNICAL FIELD

The present invention relates to an optical encoder for detecting an absolute rotation angle of an optical scale.

BACKGROUND

In general, a rotary encoder for detecting a rotation angle of an object to be measured includes an optical scale having bright and dark optical patterns, a detecting element for detecting the optical patterns on the optical scale, and a calculator disposed at a subsequent stage of the detecting element, wherein the calculator detects a rotation angle of the optical scale that is coupled to a rotary shaft of a motor or the like.

As this type of rotary encoder, there are known an incremental system in which the calculator detects a rotation angle by accumulating pulse signals outputted from the detecting element, and an absolute system in which the calculator detects an absolute angle of the optical scale in accordance with the angularly unique optical patterns on the optical scale. In the incremental system, since the rotation angle is detected by an increment from an origin, it is thus necessary to perform an origin return operation when powering on the optical encoder. On the other hand, in the absolute system, accumulation of pulse signals is not required and thus it is unnecessary to perform an origin return operation when powering on the optical encoder. This allows quick restart from emergency stop or power failure.

There is further known a system of modulating optical patterns on an optical scale as a technique for detection of an absolute angle or an absolute position. For example, a linear scale measurement device according to Patent Document 1 includes an optical scale having transparent portions and opaque portions, a projector for irradiating the optical scale with light, and a light receiver for receiving light from the optical scale, wherein the line widths of the opaque portions on the optical scale are gradually varied from thinner lines to thicker lines so that an amount of transmitted light detected by the light receiver is sinusoidally varied.

A position detection device according to Patent Document 2 includes an optical scale having light shielding portions and light transmitting portions, a projector for irradiating the optical scale with light, and a light receiver for receiving light from the optical scale, wherein lengths of the light shielding portions on the optical scale are modulated so that an absolute amount of light transmitting the optical scale is monotonously decreased or increased.

PRIOR ART DOCUMENT

Patent Document

[Patent Document 1] JP 61-182522 A (FIG. 6)
[Patent Document 2] JP 2007-248359 A (FIGS. 1 and 2)
[Patent Document 3] JP 2003-177036 A
[Patent Document 4] JP 2003-75200 A
[Patent Document 5] JP 2005-164533 A

SUMMARY OF THE INVENTION

Problem to be Solved by the Invention

According to Patent Document 1, the optical patterns on the optical scale are modulated to obtain a sine wave output, and a light receiving element is further provided at a position displaced by quarter cycle to obtain a cosine wave output. The absolute angle can be detected by performing arctangent calculation with use of the sine and cosine wave outputs.

However, if there is a positional error in the optical system and the bottom of the outputted sine wave is raised, there is generated an offset error a. When the offset and an amplitude of the sine wave output are denoted by a and b, respectively, the result of the arctangent calculation is expressed by the following equation and thus an error $\epsilon$ is generated.

[Equation 1]

$$\theta' = \tan^{-1}\left(\frac{a + b\sin\theta}{a + b\cos\theta}\right) = \tan^{-1}\left(\frac{\frac{a}{b} + \sin\theta}{\frac{a}{b} + \cos\theta}\right) = \varepsilon + \theta \quad (1)$$

More specifically, the angle error $\epsilon$ is determined by a fraction of the offset error a with respect to the amplitude b. Accordingly, the value of a/b is decreased by increasing the amplitude b, so as to reduce the influence by the offset error a. In case of the optical scale according to Patent Document 1, however, in order to increase the amplitude so as to increase the difference between the maximum amount of light and the minimum amount of light, the width of the transparent portion must be as small as possible at a position corresponding to the bottom of the sine wave, while the width of the opaque portion must be as small as possible at a position corresponding to the peak of the sine wave. There is limitation of production when increasing the amplitude.

In accordance with Patent Document 2, while a linear encoder can obtain a triangle or sine wave output, a rotary encoder must have circular arc optical patterns in order to realize a sine wave output, thereby requiring complicated design. Furthermore, the linear encoder and the rotary encoder require different techniques for designing the optical scales, which further complicates the design.

It is an object of the present invention to provide an optical encoder having higher accuracy and higher resolution as compared with a conventional optical encoder.

Means for Solving the Problem

In order to achieve the object mentioned above, an optical encoder according to the present invention includes:

an optical scale having periodical optical patterns and can be relatively and angularly displaced;

a projector for irradiating the optical scale with light;

a light receiver for receiving light from the optical scale; and a calculator for calculating an absolute rotation angle $\theta$ of the optical scale in accordance with a signal from the light receiver;

wherein the optical patterns include a plurality of light shielding portions and a plurality of light transmitting portions, each of the portions being located alternately, and when a pitch of an n-th light shielding portion in a predetermined circumferential direction is denoted by Pn and a width of the n-th light shielding portion is denoted by Wn, a transmissivity $T(\theta_n)$ corresponding to an angle $\theta_n$ of the n-th light shielding portion and the pitch Pn of the light shielding portion satisfy the following equations, and the width Wn of the light shielding portion in the optical patterns varies in accordance with a function of the pitch Pn of the light shielding portion.

[Equation 2]

$$T(\theta_n) = \frac{P_n - W_n}{P_n} = 1 - \frac{W_n}{P_n} \quad (A1)$$

$$\theta_n = \theta_{n-1} + P_n \quad (A2)$$

Effect of the Invention

According to the present invention, both the pitch Pn of the light shielding portion and the width Wn of the light shielding portion vary in the circumferential direction of the optical scale, so that any desired transmissivity during rotation of the optical scale can be achieved. In comparison to modulation only by the pitch or the width, it is possible to increase the difference between the maximum amount of light and the minimum amount of light. As a result, it is possible to measure the absolute rotation angle θ of the optical scale with higher accuracy and higher resolution.

EMBODIMENT FOR CARRYING OUT THE INVENTION (Embodiment 1)

Figure 1:
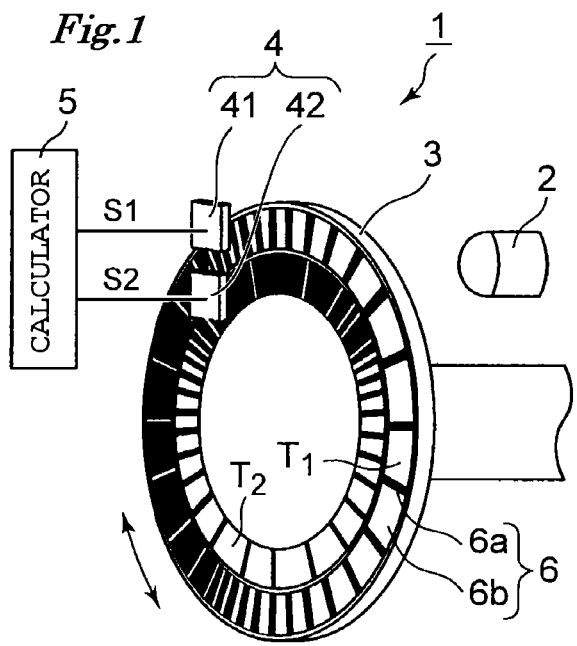
FIG. 1 is a perspective view showing a configuration according to Embodiment 1 of the present invention.

FIG. 1 is a perspective view showing a configuration according to Embodiment 1 of the present invention. An optical encoder 1 includes a projector 2, an optical scale 3, a light receiver 4, and a calculator 5.

The projector 2 functions as a light source for irradiating the optical scale 3 with light. For example, a light emitting diode (LED) is preferably used in view of lifetime and cost. The LED may be provided with a lens, or can be configured only of a chip in order for cost reduction. There may be provided an optical system, such as lens or mirror, between the projector 2 and the optical scale 3.

The optical scale 3 is supported so as to be angularly displaced relatively to the projector 2 and the light receiver 4, and has periodical optical patterns 6 configured of a plurality of light shielding portions 6a and a plurality of light transmitting portions 6b, each of the portions being located alternately in a circumferential direction. The optical patterns 6 serve as a light intensity modulator for modulating intensity of the light irradiated from the projector 2.

The present embodiment exemplifies a transmission type of encoder in which the optical scale 3 is interposed between the projector 2 and the light receiver 4. Alternatively, it is also possible to adopt a reflection type of encoder in which the projector 2 and the light receiver 4 are located on the one side of the optical scale 3. In any one of the transmission and reflection types, the optical scale 3 is not particularly limited in terms of its configuration as long as the optical scale 3 is provided with a periodic structure configured of light transmitting portions and light shielding portions or of reflecting portions and non-reflecting portions.

Figure 2:
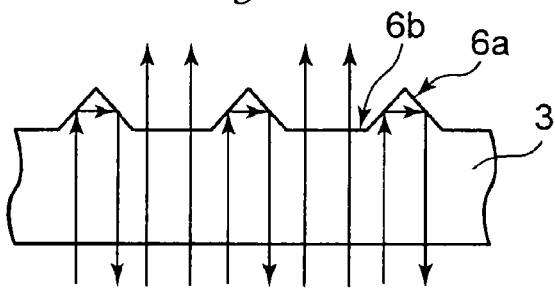
FIG. 2 is a sectional view showing an example of an optical scale.
Figure 3:
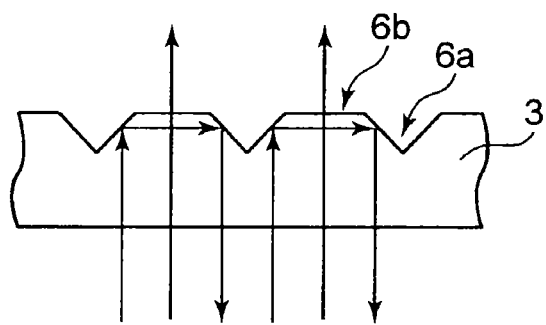
FIG. 3 is a sectional view showing another example of an optical scale.

The optical scale 3 can be formed, for example, by depositing a metal, such as chromium, on a glass substrate and patterning the metal film using photolithography. Alternatively, as shown in FIG. 2, a transparent resin, such as polycarbonate, is used for a base material, which may be molded to have the flat light transmitting portions 6b and the projecting light shielding portions 6a having a V-shaped cross section. In this case, if each of the projections has an angle not less than a critical angle of light used, the light incident to the V-shaped projections cannot pass therethrough due to total reflection, so that the projections can serve as the light shielding portions 6a. Alternatively, as shown in FIG. 3, the light shielding portions 6a can be configured of grooves each having a V-shaped cross section, which can exert a similar light shielding function. Thus, adoption of such an integrally molded product can produce the optical scale 3 at a lower cost.

The optical scale 3 is provided with at least two concentric tracks having the periodical optical patterns 6. For example, the optical patterns 6 provided on a first track T1 can modulate light intensity in accordance with a sine wave function of one cycle per rotation cycle of the optical scale 3. On the other hand, the optical patterns 6 provided on a second track T2 can modulate light intensity in accordance with a cosine wave function of one cycle per rotation cycle of the optical scale 3. Accordingly, in the optical patterns 6 on the tracks T1 and T2, the light shielding portions 6a and the light transmitting portions 6b have the same distribution profile in the circumferential direction but the phases thereof are shifted by 90 degrees to each other.

The light receiver 4 serves as a light detector for receiving light, such as transmitted light or reflected light, from the optical scale 3 and outputting a signal in proportion to the intensity of light received. The light receiver 4 can be configured of a light receiving element, such as photodiode (PD). There may be provided an optical system, such as lens or mirror, between the light receiver 4 and the optical scale 3. The light receiver 4 has two light receiving elements 41 and 42 in correspondence with the tracks T1 and T2 of the optical scale 3. When the optical scale 3 completes one rotation cycle, the light receiving element 41 outputs a signal S1 that varies in a sine wave shape and the light receiving element 42 outputs a signal S2 that varies in a cosine wave shape.

The calculator 5, which is configured of an A/D converter, a microprocessor and the like, can calculate an absolute rotation angle θ of the optical scale 3 in accordance with the signals S1 and S2 from the light receiver 4. It will be described in detail later how the absolute rotation angle θ can be calculated.

Next, the operation will be described below. The optical scale 3 is coupled to a rotary shaft of a rotating body, such as motor or rotor, and modulates the intensity of light emitted from the projector 2 in accordance with the rotation angle thereof. The light modulated by the optical patterns 6 on each of the tracks T1 and T2 is detected by each of the light receiving elements 41 and 42 of the light receiver 4.

Figure 4:
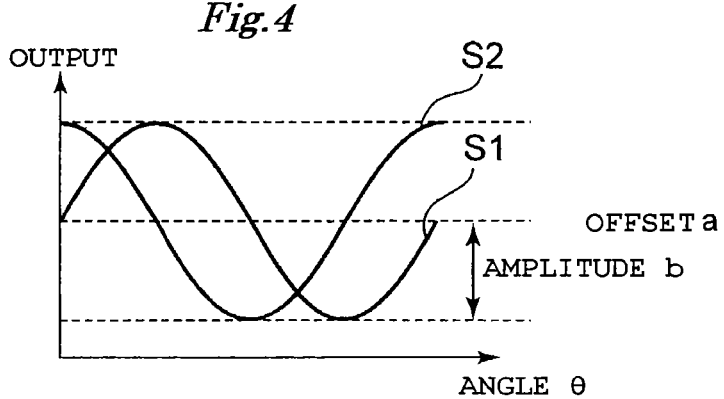
FIG. 4 is a graph indicating output signals of a light receiver.

As indicated in FIG. 4, in accordance with the rotation angle θ of the rotating optical scale 3, the light receiving element 41 can produce a sine wave output S1=(a+b×sin θ)

having an offset a and amplitude b. Similarly, the light receiving element 42 can produce a cosine wave output S2=(a+b×cos θ) having the offset a and the amplitude b.

Figure 5:
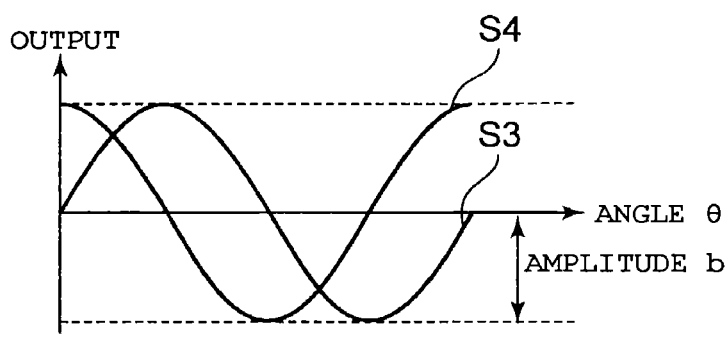
FIG. 5 is a graph indicating results obtained by subtracting an offset from the output signals of the light receiver.

The calculator 5 stores, as a correction value, the offset value a that has been measured beforehand. Thus, the calculator 5 subtracts the offset value a from each of the sine wave output S1 and the cosine wave output S2 from the light receiver 4, so as to obtain a sine wave output S3=b×sin θ without any offset and a cosine wave output S4=b×cos θ without any offset, as indicated in FIG. 5. Subsequently, the calculator 5 executes arctangent calculation in accordance with the following equation (2) so as to obtain the absolute rotation angle θ of the optical scale 3.

[Equation 3]

$$\theta = \tan^{-1}\left(\frac{b\sin\theta}{b\cos\theta}\right) \quad (2)$$

Figure 6:
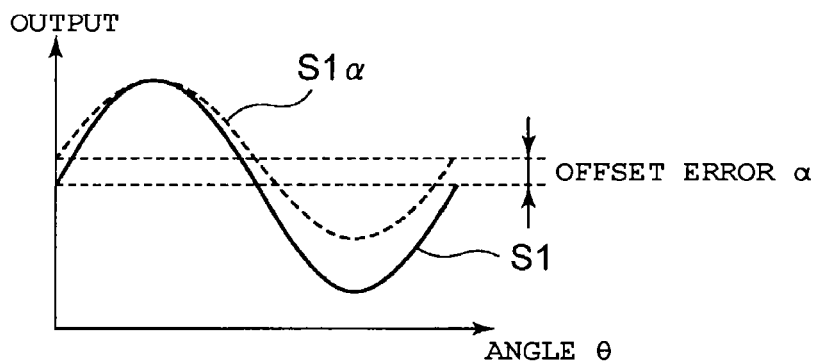
FIG. 6 is a graph indicating an offset error due to variation in amount of light.

Next, in a case where the amount of light is varied, an angle error will be described below. Assume that the amount of light is varied for some reason. In this case, as indicated in FIG. 6, the original output S1 is varied to an output S1α by addition of an offset error α. If the calculator 5 executes subtraction of the offset value a in this state, the offset error α remains. If the calculator 5 further executes arctangent calculation, there is generated an angle error ε as indicated by the following equation (3).

[Equation 4]

$$\theta' = \tan^{-1}\left(\frac{\alpha + b\sin\theta}{\alpha + b\cos\theta}\right) = \tan^{-1}\left(\frac{\frac{\alpha}{b} + \sin\theta}{\frac{\alpha}{b} + \cos\theta}\right) = \varepsilon + \theta \quad (3)$$

As apparent from the equation (3), it is necessary to increase the amplitude b in order to reduce influence by the offset error α.

Figure 7:
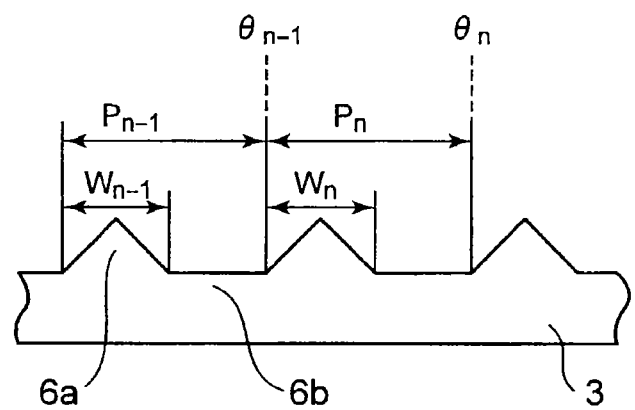
FIG. 7 is an explanatory view showing dimensions of the optical scale.

Next, how to increase the amplitude b will be described below. As show in FIG. 7, exemplified below is the optical scale 3 that includes a resin base material and is provided with projections each having a V-shaped cross section for the light shielding portions 6a. The optical scale 3, which is not limited to the above structure, may be provided with a periodic structure configured of light transmitting portions and light shielding portions or of reflecting portions and non-reflecting portions.

In the optical scale 3 that outputs a sine wave having one cycle per rotation cycle, a transmissivity T(θ) of the optical scale 3 corresponding to an angle can be expressed by the following equation (4) including a direct current component DC and an alternating current component AC. In this equation, θn indicates an angle of the n-th light shielding portion from a reference angle θ₀ in a predetermined circumferential direction.

[Equation 5]

$$T(\theta_n) = DC + AC \sin \theta_n \quad (4)$$

A transmissivity T(θn) corresponding to the angle θn of the n-th light shielding portion can be also expressed by the following equation (5) including Pn indicating a pitch of the n-th light shielding portion 6a and Wn indicating a width of the n-th light shielding portion 6a.

[Equation 6]

$$T(\theta_n) = \frac{P_n - W_n}{P_n} = 1 - \frac{W_n}{P_n} \quad (5)$$

The angle θn of the n-th light shielding portion can be defined by the following equation (6) including a pitch Pm of an m-th light shielding portion 6a.

[Equation 7]

$$\theta_n = \sum_{m=0}^{n-1} P_m \quad (6)$$

The pitch Pn and the width Wn of the n-th light shielding portion 6a are defined by the following equations (7) and (7a) including a constant A.

[Equation 8]

$$W_n = \frac{A}{P_n} \quad (7)$$

$$P_n = \frac{A}{W_n} \quad (7a)$$

Thus, by defining the pitch and the width so as to be in inverse proportion to each other, it is possible to reduce the width Wn of the light shielding portion 6a when the pitch Pn of the light shielding portion 6a is larger, and it is possible to increase the width Wn of the light shielding portion 6a when the pitch Pn of the light shielding portion 6a is smaller. Consequently, the difference between the maximum amount of light and the minimum amount of light can be larger, so that the light receiver 4 can detect an intensity of light having larger amplitude.

A transmissivity TH(θ) at the peak of the sine wave and a transmissivity TL(θ) at the bottom of the sine wave can be expressed by the following equations (8) and (9) including a pitch PH of the light shielding portion 6a and a width WH of the light shielding portion 6a at the peak of the sine wave as well as a pitch PL of the light shielding portion 6a and a width WL of the light shielding portion 6a at the bottom of the sine wave.

[Equation 9]

$$TH = 1 - \frac{WH}{PH} \quad (8)$$

$$TL = 1 - \frac{WL}{PL} \quad (9)$$

The direct current component DC and the alternating current component AC of the sine wave can be expressed by the following equations (10) and (11) including a maximum transmissivity TH and a minimum transmissivity TL.

[Equation 10]

$$DC = \frac{TH + TL}{2} \quad (10)$$

$$AC = \frac{TH - TL}{2} \quad (11)$$

The pitch Pn of the light shielding portion 6a can be expressed by the following equation (12) in accordance with the equations (4) and (5).

[Equation 11]

$$P_n = \frac{W_n}{1 - DC - AC \sin\theta_n} \quad (12)$$

The following equation (13) can be obtained by substituting the equation (7) in this equation (12).

[Equation 12]

$$P_n = \frac{1}{1 - DC - AC\sin\theta_n} \times \left(\frac{A}{P_n}\right) \quad (13)$$

$$= \left(\frac{A}{1 - DC - AC\sin\theta_n}\right)^{\frac{1}{2}}$$

For example, assuming that the width WH of the light shielding portion 6a at the peak of the sine wave is 1 degree and the pitch PH of the light shielding portion 6a at the peak of the sine wave is 10 degrees, then the transmissivity TH=90% and the constant A=10. Further, assuming that the transmissivity TL at the bottom of the sine wave is 5%, the pitch Pn corresponding to the angle of the n-th light shielding portion 6a and the angle θn of the n-th light shielding portion 6a are indicated in Table 1 as below.

TABLE 1

| n | $\theta_{n(intermediate)}$ | Pn |
|---|---|---|
| 0 | 0.00 | 4.36 |
| 1 | 4.36 | 4.51 |
| 2 | 8.87 | 4.67 |
| 3 | 13.53 | 4.85 |
| 4 | 18.38 | 5.06 |
| 5 | 23.44 | 5.30 |
| 6 | 28.74 | 5.58 |
| 7 | 34.32 | 5.92 |
| 8 | 40.24 | 6.32 |
| 9 | 46.56 | 6.80 |
| 10 | 53.36 | 7.37 |
| 11 | 60.73 | 8.05 |
| 12 | 68.79 | 8.81 |
| 13 | 77.60 | 9.54 |
| 14 | 87.14 | 9.97 |
| 15 | 97.11 | 9.84 |
| 16 | 106.95 | 9.19 |
| 17 | 116.14 | 8.35 |
| 18 | 124.49 | 7.57 |
| 19 | 132.05 | 6.91 |
| 20 | 138.96 | 6.38 |
| 21 | 145.34 | 5.94 |
| 22 | 151.28 | 5.58 |
| 23 | 156.86 | 5.29 |
| 24 | 162.15 | 5.03 |
| 25 | 167.18 | 4.82 |
| 26 | 172.00 | 4.63 |

TABLE 1-continued

| n | $\theta_{n(intermediate)}$ | Pn |
|---|---|---|
| 27 | 176.63 | 4.47 |
| 28 | 181.11 | 4.33 |
| 29 | 185.44 | 4.21 |
| 30 | 189.64 | 4.10 |
| 31 | 193.74 | 4.00 |
| 32 | 197.74 | 3.91 |
| 33 | 201.64 | 3.83 |
| 34 | 205.47 | 3.76 |
| 35 | 209.23 | 3.69 |
| 36 | 212.93 | 3.64 |
| 37 | 216.56 | 3.58 |
| 38 | 220.15 | 3.54 |
| 39 | 223.69 | 3.50 |
| 40 | 227.182 | 3.457 |
| 41 | 230.639 | 3.423 |
| 42 | 234.062 | 3.392 |
| 43 | 237.454 | 3.365 |
| 44 | 240.819 | 3.341 |
| 45 | 244.159 | 3.320 |
| 46 | 247.479 | 3.301 |
| 47 | 250.780 | 3.286 |
| 48 | 254.066 | 3.273 |
| 49 | 257.338 | 3.262 |
| 50 | 260.600 | 3.254 |
| 51 | 263.855 | 3.249 |
| 52 | 267.103 | 3.245 |
| 53 | 270.349 | 3.244 |
| 54 | 273.593 | 3.246 |
| 55 | 276.839 | 3.250 |
| 56 | 280.089 | 3.256 |
| 57 | 283.344 | 3.264 |
| 58 | 286.608 | 3.275 |
| 59 | 289.884 | 3.289 |
| 60 | 293.172 | 3.305 |
| 61 | 296.477 | 3.323 |
| 62 | 299.800 | 3.345 |
| 63 | 303.145 | 3.369 |
| 64 | 306.514 | 3.397 |
| 65 | 309.911 | 3.428 |
| 66 | 313.339 | 3.463 |
| 67 | 316.802 | 3.501 |
| 68 | 320.303 | 3.543 |
| 69 | 323.846 | 3.590 |
| 70 | 327.437 | 3.642 |
| 71 | 331.079 | 3.700 |
| 72 | 334.779 | 3.763 |
| 73 | 338.542 | 3.833 |
| 74 | 342.376 | 3.911 |
| 75 | 346.287 | 3.998 |
| 76 | 350.284 | 4.094 |
| 77 | 354.378 | 4.201 |
| 78 | 358.579 | 4.321 |
| 79 | 362.900 | 4.457 |

Assuming that n=0 is set at an origin, it is necessary to correct values in order to match the angle of the last light shielding portion 6a with the origin. An angle θn' corresponding to the position of the n-th light shielding portion 6a after the correction is corrected in accordance with the following equation (14) including the angle θ of the last light shielding portion 6a.

[Equation 13]

$$\theta'_n = \theta_n \times \frac{360}{\theta} \quad (14)$$

In this case, the pitch Pn corresponding to the angle of the n-th light shielding portion 6a and the angle θn' of the n-th light shielding portion 6a are indicated in Table 2 as below.

TABLE 2

| n | $\theta_{n(final)}$ | Pn |
|---|---|---|
| 0 | 0.00 | 4.36 |
| 1 | 4.33 | 4.51 |
| 2 | 8.80 | 4.67 |
| 3 | 13.43 | 4.85 |
| 4 | 18.24 | 5.06 |
| 5 | 23.25 | 5.30 |
| 6 | 28.51 | 5.58 |
| 7 | 34.05 | 5.92 |
| 8 | 39.92 | 6.32 |
| 9 | 46.19 | 6.80 |
| 10 | 52.94 | 7.37 |
| 11 | 60.25 | 8.05 |
| 12 | 68.24 | 8.81 |
| 13 | 76.98 | 9.54 |
| 14 | 86.44 | 9.97 |
| 15 | 96.33 | 9.84 |
| 16 | 106.10 | 9.19 |
| 17 | 115.21 | 8.35 |
| 18 | 123.49 | 7.57 |
| 19 | 131.00 | 6.91 |
| 20 | 137.85 | 6.38 |
| 21 | 144.18 | 5.94 |
| 22 | 150.07 | 5.58 |
| 23 | 155.61 | 5.29 |
| 24 | 160.85 | 5.03 |
| 25 | 165.85 | 4.82 |
| 26 | 170.63 | 4.63 |
| 27 | 175.22 | 4.47 |
| 28 | 179.66 | 4.33 |
| 29 | 183.95 | 4.21 |
| 30 | 188.13 | 4.10 |
| 31 | 192.19 | 4.00 |
| 32 | 196.15 | 3.91 |
| 33 | 200.03 | 3.83 |
| 34 | 203.83 | 3.76 |
| 35 | 207.56 | 3.69 |
| 36 | 211.23 | 3.64 |
| 37 | 214.83 | 3.58 |
| 38 | 218.39 | 3.54 |
| 39 | 221.90 | 3.50 |
| 40 | 225.37 | 3.457 |
| 41 | 228.80 | 3.423 |
| 42 | 232.19 | 3.392 |
| 43 | 235.56 | 3.365 |
| 44 | 238.89 | 3.341 |
| 45 | 242.21 | 3.320 |
| 46 | 245.50 | 3.301 |
| 47 | 248.78 | 3.286 |
| 48 | 252.04 | 3.273 |
| 49 | 255.28 | 3.262 |
| 50 | 258.52 | 3.254 |
| 51 | 261.75 | 3.249 |
| 52 | 264.97 | 3.245 |
| 53 | 268.19 | 3.244 |
| 54 | 271.41 | 3.246 |
| 55 | 274.63 | 3.250 |
| 56 | 277.85 | 3.256 |
| 57 | 281.08 | 3.264 |
| 58 | 284.32 | 3.275 |
| 59 | 287.57 | 3.289 |
| 60 | 290.83 | 3.305 |
| 61 | 294.11 | 3.323 |
| 62 | 297.40 | 3.345 |
| 63 | 300.72 | 3.369 |
| 64 | 304.06 | 3.397 |
| 65 | 307.43 | 3.428 |
| 66 | 310.84 | 3.463 |
| 67 | 314.27 | 3.501 |
| 68 | 317.74 | 3.543 |
| 69 | 321.26 | 3.590 |
| 70 | 324.82 | 3.642 |
| 71 | 328.43 | 3.700 |
| 72 | 332.10 | 3.763 |
| 73 | 335.84 | 3.833 |
| 74 | 339.64 | 3.911 |
| 75 | 343.52 | 3.998 |
| 76 | 347.48 | 4.094 |
| 77 | 351.55 | 4.201 |
| 78 | 355.71 | 4.321 |
| 79 | 360.00 | 4.457 |

Assume that the light shielding portion 6a has a constant width W and modulation is made only by the pitch Pn of the light shielding portion 6a. Similarly to the definition by the equation (7), assume that the width W is 1 degree, and the pitch PH of the light shielding portion 6a at the peak of the sine wave is 10 degrees, the transmissivity TH=90%, and the transmissivity TL at the bottom of the sine wave is 5%. The transmissivity T($\theta$n) of the n-th light shielding portion can be expressed by the following equation (15), similarly to the equation (5).

[Equation 14]

$$T(\theta_n) = 1 - \frac{W}{P_n} \qquad (15)$$

By substituting W=1 degree and TL=5% in the equation (15), PL=1.05 degrees is obtained. Accordingly, the gap between the adjacent light shielding portions 6a is 0.05 degrees at the bottom of the sine wave. Such a gap corresponds to about 8.7 μm in a case where the optical scale 3 has a radius of 10 mm on the optical patterns 6.

Meanwhile, the following equation (16) is obtained by substituting the equation (7) in the equation (9).

[Equation 15]

$$WL = \sqrt{(1-TL) \times A} \qquad (16)$$

By substituting TL=5% and A=10 in the equations (16) and (7), WL=3.08 degrees and PL=3.24 degrees are obtained. Accordingly, the gap between the adjacent light shielding portions 6a is 0.16 degrees at the bottom of the sine wave. Such a gap corresponds to about 27.9 μm in the case where the optical scale 3 has the radius of 10 mm on the optical patterns 6. This applies also to a case where modulation is made only by the width Wn of the light shielding portion 6a. More specifically, in the case of adopting the values mentioned above, definition as denoted by the equation (7) can approximately triple the likelihood of the smallest gap between the adjacent light shielding portions 6a, thereby leading to facilitation in production of the optical scale 3.

In the case where the width W of the light shielding portion 6a is constant and modulation is made only by the pitch Pn of the light shielding portion 6a, assuming that the smallest gap between the adjacent light shielding portions 6a is 0.16 degrees as in the equation (7), PL=1.16 degrees is obtained and the transmissivity is about 14% at the bottom of the sine wave. In this case, the amplitude is only about one third of that of the case defined by the equation (7).

As described above, according to this embodiment the difference between the maximum amount of light and the minimum amount of light can be larger to increase amplitude of received light, thereby reducing influence by an angle error due to an offset error. As a result, it is possible to measure the absolute rotation angle θ of the optical scale with higher accuracy and higher resolution. It is further possible to increase the smallest gap between the adjacent light shielding portions 6a, thereby facilitating production of the optical scale 3.

(Embodiment 2)

Figure 8:
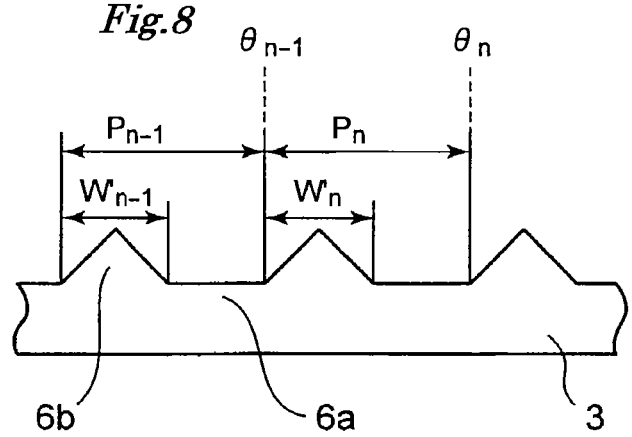
FIG. 8 is an explanatory view showing Embodiment 2 of the present invention.

FIG. 8 is an explanatory view showing Embodiment 2 of the present invention. An optical encoder according to this embodiment is configured similarly to the optical encoder 1 according to Embodiment 1, except that a width W'n of the light shielding portion 6a in the optical patterns 6 is expressed by the following equations (17) and (17a) instead of the equation (7). In these equations, a coefficient m is a real number larger than zero.

[Equation 16]

$$(W'_n)^m = \frac{A}{P_n} \quad (17)$$

$$P_n = \left(\frac{A}{W'_n}\right)^m \quad (17a)$$

Other configurations and the detection principle are similar to those of Embodiment 1. The following description will refer only to the differences and the similar portions will not be described repeatedly.

Exemplified below is the optical scale 3 that includes a resin base material and is provided with projections each having a V-shaped cross section for the light shielding portions 6a. The optical scale 3, which is not limited to the above structure, may be provided with a periodic structure configured of light transmitting portions and light shielding portions or of reflecting portions and non-reflecting portions.

Thus, by defining the relationship between the pitch Pn and the width W'n of the n-th light shielding portion 6a as expressed in the equation (17), it is possible to reduce the width W'n of the light shielding portion 6a when the pitch Pn of the light shielding portion 6a is larger, and it is possible to increase the width W'n of the light shielding portion 6a when the pitch Pn of the light shielding portion 6a is smaller. Consequently, the difference between the maximum amount of light and the minimum amount of light can be larger, so that the light receiver 4 can detect an intensity of light having larger amplitude.

By substituting W'n in the equation (17) for Wn in the equation (12), the pitch Pn of the light shielding portion 6a can be expressed by the following equation (18).

[Equation 17]

$$P_n = \left(\frac{\sqrt[m]{A}}{1 - DC - AC\sin\theta_n}\right)^{\frac{m}{m+1}} \quad (18)$$

For example, assuming that the width WH of the light shielding portion 6a at the peak of the sine wave is 1 degree and the pitch PH of the light shielding portion 6a at the peak of the sine wave is 10 degrees and the coefficient m=2, then the transmissivity TH=90% and the constant A=10. Further, assuming that the transmissivity TL at the bottom of the sine wave is 5%, the pitch Pn corresponding to the angle of the n-th light shielding portion 6a and the angle θn of the n-th light shielding portion 6a are indicated in Table 3 as below.

TABLE 3

| n | θ$_{n(intermediate)}$ | Pn |
|---|---|---|
| 0 | 0.00 | 3.31 |
| 1 | 3.31 | 3.42 |
| 2 | 6.73 | 3.54 |

TABLE 3-continued

| n | θ$_{n(intermediate)}$ | Pn |
|---|---|---|
| 3 | 10.27 | 3.67 |
| 4 | 13.94 | 3.83 |
| 5 | 17.76 | 4.00 |
| 6 | 21.76 | 4.20 |
| 7 | 25.96 | 4.43 |
| 8 | 30.40 | 4.70 |
| 9 | 35.10 | 5.03 |
| 10 | 40.13 | 5.41 |
| 11 | 45.54 | 5.88 |
| 12 | 51.42 | 6.46 |
| 13 | 57.88 | 7.16 |
| 14 | 65.04 | 8.00 |
| 15 | 73.04 | 8.93 |
| 16 | 81.97 | 9.73 |
| 17 | 91.70 | 9.99 |
| 18 | 101.69 | 9.45 |
| 19 | 111.14 | 8.46 |
| 20 | 119.60 | 7.45 |
| 21 | 127.05 | 6.62 |
| 22 | 133.67 | 5.96 |
| 23 | 139.62 | 5.43 |
| 24 | 145.06 | 5.02 |
| 25 | 150.07 | 4.67 |
| 26 | 154.74 | 4.39 |
| 27 | 159.14 | 4.15 |
| 28 | 163.29 | 3.95 |
| 29 | 167.24 | 3.78 |
| 30 | 171.01 | 3.62 |
| 31 | 174.64 | 3.49 |
| 32 | 178.13 | 3.37 |
| 33 | 181.50 | 3.26 |
| 34 | 184.76 | 3.17 |
| 35 | 187.93 | 3.08 |
| 36 | 191.02 | 3.01 |
| 37 | 194.02 | 2.94 |
| 38 | 196.96 | 2.87 |
| 39 | 199.84 | 2.82 |
| 40 | 202.65 | 2.76 |
| 41 | 205.41 | 2.71 |
| 42 | 208.13 | 2.67 |
| 43 | 210.80 | 2.63 |
| 44 | 213.42 | 2.59 |
| 45 | 216.01 | 2.55 |
| 46 | 218.57 | 2.52 |
| 47 | 221.09 | 2.49 |
| 48 | 223.58 | 2.46 |
| 49 | 226.04 | 2.44 |
| 50 | 228.48 | 2.41 |
| 51 | 230.89 | 2.39 |
| 52 | 233.29 | 2.37 |
| 53 | 235.66 | 2.35 |
| 54 | 238.01 | 2.34 |
| 55 | 240.35 | 2.32 |
| 56 | 242.67 | 2.31 |
| 57 | 244.97 | 2.29 |
| 58 | 247.27 | 2.28 |
| 59 | 249.55 | 2.27 |
| 60 | 251.82 | 2.26 |
| 61 | 254.09 | 2.26 |
| 62 | 256.34 | 2.25 |
| 63 | 258.59 | 2.24 |
| 64 | 260.83 | 2.24 |
| 65 | 263.07 | 2.23 |
| 66 | 265.31 | 2.23 |
| 67 | 267.54 | 2.23 |
| 68 | 269.77 | 2.23 |
| 69 | 272.00 | 2.23 |
| 70 | 274.23 | 2.23 |
| 71 | 276.46 | 2.23 |
| 72 | 278.69 | 2.24 |
| 73 | 280.93 | 2.24 |
| 74 | 283.17 | 2.25 |
| 75 | 285.42 | 2.25 |
| 76 | 287.67 | 2.26 |
| 77 | 289.93 | 2.27 |
| 78 | 292.20 | 2.28 |
| 79 | 294.48 | 2.29 |
| 80 | 296.77 | 2.30 |

TABLE 3-continued

| n | $\theta_{n(intermediate)}$ | Pn |
|---|---|---|
| 81 | 299.08 | 2.32 |
| 82 | 301.39 | 2.33 |
| 83 | 303.73 | 2.35 |
| 84 | 306.07 | 2.37 |
| 85 | 308.44 | 2.39 |
| 86 | 310.83 | 2.41 |
| 87 | 313.24 | 2.43 |
| 88 | 315.67 | 2.46 |
| 89 | 318.12 | 2.48 |
| 90 | 320.60 | 2.51 |
| 91 | 323.11 | 2.54 |
| 92 | 325.66 | 2.58 |
| 93 | 328.23 | 2.61 |
| 94 | 330.85 | 2.65 |
| 95 | 333.50 | 2.70 |
| 96 | 336.19 | 2.74 |
| 97 | 338.93 | 2.79 |
| 98 | 341.73 | 2.85 |
| 99 | 344.57 | 2.91 |
| 100 | 347.48 | 2.97 |
| 101 | 350.45 | 3.04 |
| 102 | 353.50 | 3.12 |
| 103 | 356.62 | 3.21 |
| 104 | 359.83 | 3.31 |

Similarly to Embodiment 1, it is necessary to correct values in order to match the angle of the last light shielding portion 6a with the origin. The angle θn' corresponding to the position of the n-th light shielding portion 6a after the correction is corrected in accordance with the equation (14) including the angle θ of the last light shielding portion 6a.

In this case, the pitch Pn corresponding to the angle of the n-th light shielding portion 6a and the angle θn' of the n-th light shielding portion 6a are indicated in Table 4 as below.

TABLE 4

| n | $\theta_{n(final)}$ | Pn |
|---|---|---|
| 0 | 0.00 | 3.31 |
| 1 | 3.40 | 3.42 |
| 2 | 6.85 | 3.54 |
| 3 | 10.36 | 3.67 |
| 4 | 13.95 | 3.83 |
| 5 | 17.77 | 4.00 |
| 6 | 21.77 | 4.20 |
| 7 | 25.98 | 4.43 |
| 8 | 30.41 | 4.70 |
| 9 | 35.12 | 5.03 |
| 10 | 40.15 | 5.41 |
| 11 | 45.56 | 5.88 |
| 12 | 51.45 | 6.46 |
| 13 | 57.91 | 7.16 |
| 14 | 65.07 | 8.00 |
| 15 | 73.07 | 8.93 |
| 16 | 82.01 | 9.73 |
| 17 | 91.75 | 9.99 |
| 18 | 101.74 | 9.45 |
| 19 | 111.20 | 8.46 |
| 20 | 119.66 | 7.45 |
| 21 | 127.11 | 6.62 |
| 22 | 133.73 | 5.96 |
| 23 | 139.69 | 5.43 |
| 24 | 145.12 | 5.02 |
| 25 | 150.14 | 4.67 |
| 26 | 154.82 | 4.39 |
| 27 | 159.21 | 4.15 |
| 28 | 163.37 | 3.95 |
| 29 | 167.32 | 3.78 |
| 30 | 171.10 | 3.62 |
| 31 | 174.72 | 3.49 |
| 32 | 178.21 | 3.37 |
| 33 | 181.58 | 3.26 |
| 34 | 184.85 | 3.17 |

TABLE 4-continued

| n | $\theta_{n(final)}$ | Pn |
|---|---|---|
| 35 | 188.02 | 3.08 |
| 36 | 191.11 | 3.01 |
| 37 | 194.12 | 2.94 |
| 38 | 197.06 | 2.87 |
| 39 | 199.93 | 2.82 |
| 40 | 202.75 | 2.76 |
| 41 | 205.51 | 2.71 |
| 42 | 208.23 | 2.67 |
| 43 | 210.90 | 2.63 |
| 44 | 213.53 | 2.59 |
| 45 | 216.12 | 2.55 |
| 46 | 218.67 | 2.52 |
| 47 | 221.19 | 2.49 |
| 48 | 223.69 | 2.46 |
| 49 | 226.15 | 2.44 |
| 50 | 228.59 | 2.41 |
| 51 | 231.00 | 2.39 |
| 52 | 233.40 | 2.37 |
| 53 | 235.77 | 2.35 |
| 54 | 238.12 | 2.34 |
| 55 | 240.46 | 2.32 |
| 56 | 242.78 | 2.31 |
| 57 | 245.09 | 2.29 |
| 58 | 247.39 | 2.28 |
| 59 | 249.67 | 2.27 |
| 60 | 251.94 | 2.26 |
| 61 | 254.21 | 2.26 |
| 62 | 256.46 | 2.25 |
| 63 | 258.71 | 2.24 |
| 64 | 260.96 | 2.24 |
| 65 | 263.20 | 2.23 |
| 66 | 265.43 | 2.23 |
| 67 | 267.66 | 2.23 |
| 68 | 269.90 | 2.23 |
| 69 | 272.13 | 2.23 |
| 70 | 274.36 | 2.23 |
| 71 | 276.59 | 2.23 |
| 72 | 278.82 | 2.24 |
| 73 | 281.06 | 2.24 |
| 74 | 283.30 | 2.25 |
| 75 | 285.55 | 2.25 |
| 76 | 287.81 | 2.26 |
| 77 | 290.07 | 2.27 |
| 78 | 292.34 | 2.28 |
| 79 | 294.62 | 2.29 |
| 80 | 296.91 | 2.30 |
| 81 | 299.22 | 2.32 |
| 82 | 301.54 | 2.33 |
| 83 | 303.87 | 2.35 |
| 84 | 306.22 | 2.37 |
| 85 | 308.59 | 2.39 |
| 86 | 310.98 | 2.41 |
| 87 | 313.38 | 2.43 |
| 88 | 315.82 | 2.46 |
| 89 | 318.27 | 2.48 |
| 90 | 320.76 | 2.51 |
| 91 | 323.27 | 2.54 |
| 92 | 325.81 | 2.58 |
| 93 | 328.39 | 2.61 |
| 94 | 331.00 | 2.65 |
| 95 | 333.66 | 2.70 |
| 96 | 336.35 | 2.74 |
| 97 | 339.10 | 2.79 |
| 98 | 341.89 | 2.85 |
| 99 | 344.74 | 2.91 |
| 100 | 347.65 | 2.97 |
| 101 | 350.62 | 3.04 |
| 102 | 353.67 | 3.12 |
| 103 | 356.79 | 3.21 |
| 104 | 360.00 | 3.31 |

From the equations (16) and (17), a width W'L of the light shielding portion 6a and the pitch PL of the light shielding portion 6a at the smallest gap of the sine wave are obtained as W'L=2.12 degrees and PL=2.23 degrees, respectively. The gap between the adjacent light shielding portions 6a at the bottom of the sine wave is 0.11 degrees, which is slightly smaller than the gap in the case of m=1 as described in Embodiment 1. However, the number of gradation forming the sine wave having one cycle per rotation cycle is increased as indicated in Table 3, and the angle prior to angular correction in accordance with the equation (14) is approximately matched with the origin. This reduces an error with respect to an ideal sine wave to perform detection with higher accuracy.

As described above, according to this embodiment the difference between the maximum amount of light and the minimum amount of light can be larger to increase amplitude of received light, thereby reducing influence by an angle error due to an offset error. As a result, it is possible to measure the absolute rotation angle θ of the optical scale with higher accuracy and higher resolution. It is further possible to increase the smallest gap between the adjacent light shielding portions 6a, thereby facilitating production of the optical scale 3. Moreover, the number of gradation forming the sine wave having one cycle per rotation cycle is increased. This reduces an error with respect to the ideal sine wave to perform detection with higher accuracy.

[Explanatory Note]

1 OPTICAL ENCODER
2 PROJECTOR
3 OPTICAL SCALE
4 LIGHT RECEIVER
5 CALCULATOR
6 OPTICAL PATTERNS
6a LIGHT SHIELDING PORTION
6b LIGHT TRANSMITTING PORTION
41, 42 LIGHT RECEIVING ELEMENT

The invention claimed is:

1. An optical encoder comprising:
   an optical scale having periodical optical patterns and can be relatively and angularly displaced;
   a projector for irradiating the optical scale with light;
   a light receiver for receiving light from the optical scale; and
   a calculator for calculating an absolute rotation angle θ of the optical scale in accordance with a signal from the light receiver;
   wherein the optical patterns include a plurality of light shielding portions and a plurality of light transmitting portions, each of the portions being located alternately, and
   when a pitch of an n-th light shielding portion in a predetermined circumferential direction is denoted by Pn and a width of the n-th light shielding portion is denoted by Wn, a transmissivity T(θn) corresponding to an angle θn of the n-th light shielding portion and the pitch Pn of the light shielding portion satisfy the following equations (A1 and (A2), and
   the width Wn of the light shielding portion in the optical patterns is expressed by the following equation (A3) including a pitch PH of the light shielding portion, a constant A and a coefficient m (m is a real number larger than zero)

[Equation 1]

$$T(\theta_n) = \frac{P_n - W_n}{P_n} = 1 - \frac{W_n}{P_n} \tag{A1}$$

$$\theta_n = \theta_{n+1} + P_n \tag{A2}$$

$$(Wn')^m = \frac{A}{Pn}. \tag{A3}$$

2. The optical encoder according to claim 1, wherein the transmissivity T(θn) of the optical patterns is expressed by the following equations including a maximum transmissivity TH and a minimum transmissivity TL

[Equation 2]

$$T(\theta_n) = DC + AC\sin\theta_n \tag{A4}$$

$$DC = \frac{TH + TL}{2} \tag{A5}$$

$$AC = \frac{TH - TL}{2}. \tag{A6}$$

* * * * *